United States Patent Office 3,250,546
Patented May 10, 1966

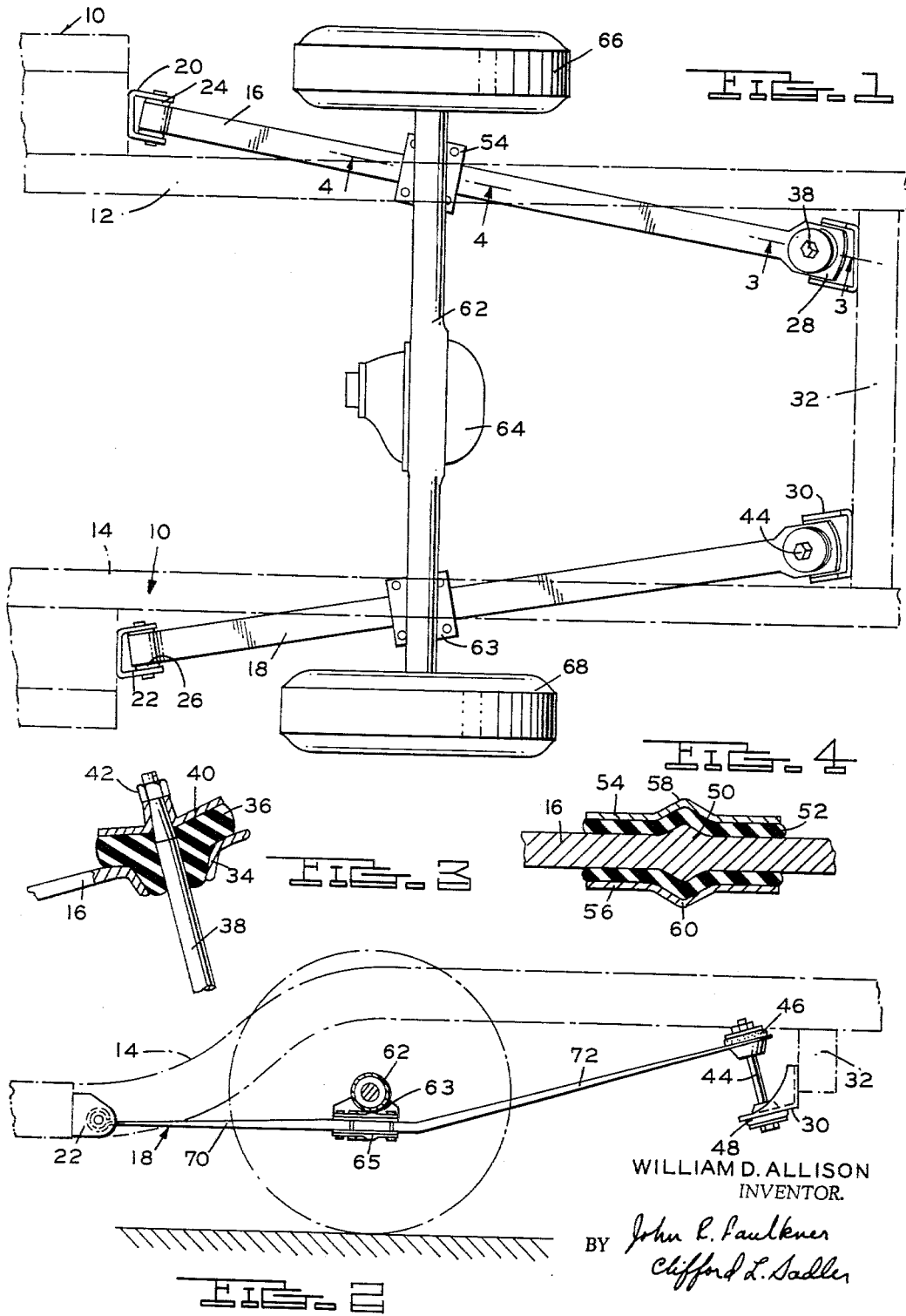

3,250,546
LEAF SPRING SUSPENSION SYSTEM FOR MOTOR VEHICLES
William D. Allison, Grosse Pointe Farms, Mich., assignor to Ford Motor Company, Dearborn, Mich., a corporation of Delaware
Filed Oct. 16, 1964, Ser. No. 404,222
7 Claims. (Cl. 280—124)

The present invention relates generally to leaf spring suspensions for motor vehicles, and more particularly to improvements in Hotchkiss type rear suspension systems.

The basic objective of any vehicle suspension system is to provide a spring support for a vehicle body which transmits a minimum amount of disturbance from road irregularities while providing a maximum amount of controllability for the vehicle. These features are not always compatible. In conventional suspension structures, a soft ride usually leads to instability at high vehicle speeds or loss of precise cornering control. Similiarly, a vehicle suspension system having exceptional road holding or control characteristics is usually accompanied by a harsh ride.

In view of the state of the art, it is an object of the present invention to provide a vehicle suspension structure which has both soft ride characteristics and good road holding and handling qualities.

It is also an object of the present invention to provide a vehicle suspension system having controlled lateral flexibility or compliance between the axle and body for the purpose of reducing harshness and improving road holding ability. The present invention also includes understeer geometry that is responsive to vehicle side loading. This is sometimes referred to as side thrust understeer.

More particularly, it is an object of the present invention to provide a preferred embodiment in which a pair of single leaf springs support the vehicle body upon a rigid axle housing. The single leaf springs are arranged in a diverging outwardly and forwardly relationship. A tension shackle connects the rear ends of the leaf springs with the vehicle body. This tension link has universal connections at its ends to permit lateral movement of the body with respect to the wheels and axle.

The many objects and advantages of the present invention will be fully understood upon consideration of the following details description and the accompanying drawings, in which:

FIGURE 1 is a top plan view of a rear suspension system for a motor vehicle constructed in accordance with the present invention;

FIGURE 2 is a side elevational view of the a vehicle suspension of FIGURE 1;

FIGURE 3 is a sectional view through section lines 3—3 of FIGURE 1; and

FIGURE 4 is a sectional view taken along section lines 4—4 of FIGURE 1.

Referring now to the drawings wherein the presently preferred embodiment of this invention is illustrated, FIGURE 1 discloses an improved Hotchkiss rear suspension system. A vehicle frame 10 is provided to support a vehicle body. The frame 10 includes right and left side rails 12 and 14. A pair of single leaf springs 16 and 18 have their forward ends connected to frame mounted brackets 20 and 22 by resilient bushings 24 and 26 of the silent block type. The rear ends of the leaf springs are connected to rear frame mounted brackets 28 and 30. The brackets 28 and 30 are welded to a frame cross member 32 which interconnects the rear ends of the frame side rails 12, 14.

As disclosed in FIGURE 3, the rear end of the leaf spring 16 is provided with an apertured pocket or cup-shaped portion 34 which receives a hat-shaped rubber member 36. A link 38 extends through the open base of the cup portion 34 and through the rubber member 36. A hat-shaped washer 40 is situated on the upper surface of the rubber member 36 and is secured to the tapered upper end of the link 38 by the nut 42. The construction illustrated in FIGURE 3 permits substantially universal movement of a few degrees between the link 38 and the spring 16.

The brackets 28 and 30 are provided with apertured pockets or cup-shaped portions similar in configuration to cup-shaped portion 34 of leaf spring 16. The lower end of the rod 38 passes through the cup-shaped portion of the bracket 28 and is secured by means of a rubber bushing, a washer and a nut similar to the construction of FIGURE 3.

The left-hand leaf spring 18 is also provided with a link 44 which is connected through upper and lower rubber bushings 46 and 48 to the outer end of the spring 18 and the bracket 30, respectively. Once again, the construction of the bushings 48, 46 and the pockets which receives the bushings is similar to that which is illustrated in FIGURE 3.

The midportion of the spring 16 is enlarged as shown at location 50 in FIGURE 4. A rubber layer 52 surrounds the portion 50 of the spring 16 and it, in turn, is enclosed by a sheet metal bracket having upper and lower halves 54 and 56. The brackets 54 and 56 bulge outwardly at 58 and 60 in a fashion to complement the enlarged portion 50 of the spring 16. The spring clamps or brackets 54 and 56 are secured to an axle housing 62 in a conventional fashion by either weldments or U-bolts.

The leaf spring 18 is similarly provided with sheet metal spring clamps 63, 65 which secure that spring to the left-hand end of the axle housing 62.

The axle housing 62 is rigid and extends transversely of the frame members 12 and 14. Centrally situated within the axle housing 62 is a differential gear unit 64 which receives power from a front mounted engine (not shown). Right and left driving wheels 66 and 68 are journalled at the outer ends of the axle housing 62.

The springs 16 and 18 are tapered so as to have a uniform level of stress throughout their length. The forward section 70 of the spring 18 between the axle housing 62 and the frame brackets 20, 22 is flat and substantially horizontal when the vehicle is standing at its designed height. The rear portion of the spring 18 between the axle housing 62 and the rear frame brackets 28 and 30 is straight and extends upwardly and rearwardly. This latter spring portion is identified by reference numeral 72. Spring 16 is similarly contoured.

In view of the flexible mounting of the rear end of the springs and the flexible attachment of the springs to the axle housing, a side load applied to the vehicle body will displace the body laterally with respect to the axle. An example of such a load is the centrifugal force created during cornering of a vehicle. Because the springs 16 and 18 extend in a forwardly and outwardly direction, a steering effect will be produced upon the axle. This steering effect is known as understeer because it will tend to turn the vehicle out of the curve which produced the centrifugal force.

Assuming the vehicle of FIGURE 1 is executing a left-hand turn, centrifugal force will tend to move the vehicle body and the frame 10 to the right relative to the wheels 66, 68 and the axle housing 62. When the frame 10 moves to the right, the right spring 16 will cause the right-hand end of the axle housing 62 to move forwardly. Similarly, left spring 18 will move the left end of axle 62 rearwardly. This movement of the axle will produce a steering effect tending to steer the vehicle out of the curve.

Modifications and alterations of the present invention may occur to those who are skilled in the art which will come within the scope and spirit of the following claims.

I claim:

1. A motor vehicle suspension system having a frame, a pair of wheels, a rigid axle housing interconnecting said wheels, a pair of leaf spring members, said leaf spring members having their forward ends connected to said frame and their rearward ends connected to said frame, said axle housing being connected to said spring members at their midpoints, the forward ends of said spring members being spaced apart by a greater amount than their rearward ends, means connecting each of said rearward spring member ends to said frame, each of said means comprising a cup-shaped aperture formed in the end of one of said spring members, a cup-shaped aperture formed in a frame mounted bracket, a link extending through said apertures, a complementary rubber bushing interconnecting each of the ends of said link with said spring member end and said frame mounted bracket, respectively.

2. A motor vehicle suspension system having a frame, a pair of wheels, a rigid axle housing interconnecting said wheels, a pair of single leaf springs, said leaf springs having their forward ends connected to said frame and their rearward ends connected to said frame, resilient means connecting said axle housing to said springs at their midpoints, the forward ends of said springs being spaced by a greater amount than their rearward ends, means connecting each of said rearward springs ends to said frame, each of said means comprising a cup-shaped aperture formed in the end of one of said springs, a cup-shaped aperture formed in a frame mounted bracket, a link extending through said apertures, a complementary rubber bushing interconnecting each of the ends of said link with said spring end and said frame mounted brackets, respectively.

3. A motor vehicle suspension system having a frame, a pair of wheels, a rigid axle housing interconnecting said wheels, a pair of single leaf springs, said leaf springs having their forward ends connected to said frame and their rearward ends connected to said frame, said axle housing being connected to said springs at their midpoints, the forward ends of said springs being spaced apart by a greater amount than their rearward ends, means connecting each of said rear spring ends to said frame, each of said means comprising a cup-shaped aperture formed in the end of one of said springs, a cup-shaped aperture formed in a frame mounted bracket, a link extending through said apertures, a complementary rubber bushing interconnecting each of the ends of said link with said spring end and said frame mounted bracket, respectively, the portion of said springs forwardly of said axle housing being substantially horizontal, the portion of said springs rearwardly of said axle housing being substantially flat and extending in an upwardly and rearwardly direction.

4. A vehicle suspension system having a vehicle frame, an axle housing, a pair of wheels connected to the outer ends of said axle housing, a pair of leaf springs connected to said axle housing, said springs being arranged in a forwardly and outwardly diverging relationship with respect to each other, the forward ends of said springs being connected to said frame, link means interconnecting the rear ends of said springs and said frame, said link means having universal pivotal connection with both said link and said frame.

5. A vehicle suspension system having a vehicle frame, an axle housing, a pair of wheels connected to the outer ends of said axle housing, a pair of single leaf springs, resilient means connecting said springs to said axle housing, said springs being arranged in a forwardly and outwardly diverging relationship with respect to each other, the forward ends of said springs being connected to said frame, link means interconnecting rear ends of said springs and said frame, said link means having universal pivotal connections with both said link and said frame.

6. A vehicle suspension system having a vehicle frame, an axle housing, a pair of wheels connected to the outer ends of said axle housing, a pair of single leaf springs, resilient means connecting said springs to said axle housing, said springs being arranged in a forwardly and outwardly diverging relationship with respect to each other, the forward ends of said springs being connected to said frame, link means interconnecting the rear ends of said springs and said frame, said link means having universal pivotal connections with both said link and said frame, the portion of said springs forwardly of said axle housing being substantially horizontal, the portion of said springs rearwardly of said axle housing being substantially flat and extending in an upwardly and rearwardly direction.

7. A vehicle suspension system having a vehicle frame, an axle housing, a pair of wheels connected to the outer ends of said axle housing, a pair of leaf springs connected to said axle housing, said springs being arranged in a forwardly and outwardly diverging relationship with respect to each other, the forward ends of said springs being connected to said frame, flexible means interconnecting the rear ends of said springs and said frame, said flexible means being constructed to permit said vehicle frame to move laterally with respect to said axle housing and said wheels in response to a lateral force whereby said leaf springs cause said axle to cant in the direction of understeer.

References Cited by the Examiner

UNITED STATES PATENTS

| | | | |
|---|---|---|---|
| 2,843,397 | 7/1958 | Bastow | 280—124 |
| 3,061,301 | 10/1962 | Bajer | 267—52 |
| 3,154,323 | 10/1964 | Hooven | 280—124 |
| 3,171,642 | 3/1965 | Allison | 280—124 X |
| 3,193,303 | 7/1965 | Allison | 280—124 |

BENJAMIN HERSH, *Primary Examiner.*

W. A. MARCONTELL, *Assistant Examiner.*